United States Patent [19]

Chong

[11] Patent Number: 5,335,169

[45] Date of Patent: Aug. 2, 1994

[54] SYSTEM FOR TRACKING MULTIPLE RATE ASSESSMENTS ON TRANSACTIONS

[75] Inventor: Malcolm K. L. Chong, Honolulu, Hi.

[73] Assignee: DSI of Hawaii, Inc., Honolulu, Hi.

[21] Appl. No.: 826,013

[22] Filed: Jan. 27, 1992

[51] Int. Cl.⁵ .............................................. G06F 15/20
[52] U.S. Cl. ..................................... 364/408; 364/406
[58] Field of Search ................ 364/401, 406, 408, 419

[56] References Cited

PUBLICATIONS

Robert Nicolai, Tax Record, Data Sources, Computer Associates International, Inc., 1990.
RJL Systems, Sales Tax File, Data Sources Computer Associates International, Inc., 1990.
Invoicing/Sales Analysis System, C-Pak Corp. Ga. USA 30240, Mar. 1987.

*Primary Examiner*—Roy N. Envall, Jr.
*Assistant Examiner*—Frantzy Poinvil
*Attorney, Agent, or Firm*—Ostrager, Chong & Flaherty

[57] ABSTRACT

A computerized system for tracking multiple types of sales tax assessments for different taxing authorities on different types of sales transactions with customers has a programmed operation which includes: (a) a support file maintenance interface for maintaining support files for different tax types, taxing authorities, tax rates, customers, and sales types; (b) a sales entry interface for entering sales orders into the system by customer identification number, sales type code, and sales amount; (c) a sales recording module for creating a sales record corresponding to each sales order entered including the customer data obtained from the customer support file indexed to the customer identification number and a sales tax amount as computed by application of the tax rate designated in the customer support file to the sales amount for sales that are not tax-exempt; and (d) a sales tax reporting module for sorting the sales records by tax authorities, tax types, and sales types, and for creating a sales tax report for each tax authority showing total sales and tax amounts for taxable sales, and total sales amount for non-taxable and exempt sales. Definition of the tax type in a support file as exempt allows the system to bypass the computation of a sales tax amount and to report the exempt sales amount.

7 Claims, 4 Drawing Sheets

SYSTEM FOR TRACKING MULTIPLE RATE ASSESSMENTS ON TRANSACTIONS

FIELD OF THE INVENTION

This invention generally relates to a system for tracking multiple types of rate assessments on transactions, and particularly to a system for tracking and reporting taxable, non-taxable, and tax exempt sales transactions subject to a number of taxing jurisdictions or authorities.

BACKGROUND ART

Companies operating in national or global markets frequently conduct sales transactions in a number of taxing jurisdictions and/or are subject to a number of taxing authorities within the same or different jurisdictions. Such companies are required to collect many different types and percentages of sales or excise taxes, and to report their sales transactions and collected taxes to each applicable taxing jurisdiction or authority. The companies may sell different types of goods or services to different types of customers that may be taxable at different rates, non-taxable, or exempt from taxation.

For example, a company may sell goods and services in different states to customers located in different localities within such states. Each individual state or locality may have more than one level of government or governmental agencies that tax the sale of goods and services. For instance, goods sold in New York City are subject to two levels of sales taxes, i.e., a sales tax for the State of New York, and one for the City of New York. The combination of these two levels of government make up one taxing authority. A state typically has many taxing authorities, for example, a taxing authority for the State of New York and the County of Suffolk, or the City of Syracuse. The different taxing authorities may have the same or different sales tax rates. A taxing authority may even have different sales tax rates for different types of goods or services, or may define certain types of goods or services as non-taxable. Certain types of entities or transactions may be tax-exempt, such as sales to schools, churches, hospitals, or governmental agencies.

At periodic intervals, companies are required to report their sales revenues and collected taxes to the different taxing jurisdictions or authorities. A breakdown of taxable sales, non-taxable sales, and exempt sales is typically required. If a company does not have a presence, e.g., an office or legal entity, in another state, it may not be required to collect sales taxes on its out-of-state sales. Some taxing authorities may require taxes to be collected and reported regardless of where sales are made.

These different tax collection and reporting requirements can be very confusing and onerous for a company conducting business in multiple jurisdictions. Conventional accounting systems typically require the user entering sales data in the system to differentiate between the different jurisdictions in which tax collection and reporting are required, between taxable, non-taxable, and tax-exempt sales categories and types of customers, and the different tax rates that are applicable. The user typically must make manual entry of the appropriate tax codes, rates, transaction types, and taxing jurisdictions, which is very difficult and time consuming, and subject to entry errors. Such complicated manual entries may also be required for other types of multiple rate assessments on transactions, for example, assessments of royalties, customs duties, commissions, postage, insurance, etc.

It is therefore a principal object of the present invention to provide a system for tracking multiple types of rate assessments on transactions. It is a particular object that such a system be capable of automatically tracking the appropriate sales tax rates, sales types, and taxing jurisdictions for the user based upon a limited set of transaction designations. It is also desirable that such a system have the flexibility for adaptation to other types of multiple rate assessments on transactions.

SUMMARY OF THE INVENTION

In accordance with the present invention, a system for tracking multiple rate assessments types on transactions with customers of a user of the system includes a computer having a processing unit, memory storage, input, display and other output device, which is programmed by means operable on said computer comprising:

(a) first defining means for assigning a rate assessment type code to each one of a plurality of rate assessment types; second defining means for assigning an assessment rate code to each one of a plurality of assessment rates; and third defining means for defining customer data indexed to a customer identification code, including customer identification, a rate assessment type code, and an assessment rate code, for each of the user's customers;

(b) transaction entry means for entering a series of transaction orders into the system, wherein each transaction order includes at least a customer identification number and a transaction amount;

(c) transaction recording means for creating a transaction record corresponding to each transaction order entered, wherein each transaction record includes at least the transaction amount, the customer identification and rate assessment type as obtained from the customer support file indexed to the customer identification number, and a rate assessment amount as computed by application of the assessment rate obtained from the customer support file to the transaction amount; and (d) rate assessment reporting means for sorting the transaction records by rate assessment types, and for creating a rate assessment report showing total transaction amounts and rate assessment amounts for each of the rate assessment types defined for inclusion in the rate assessment report.

In a preferred embodiment of the invention, a system for tracking multiple types of sales tax assessments for different taxing authorities on different types of sales transactions with customers includes:

(a) a support file maintenance interface for maintaining support files for different tax types, taxing authorities, tax rates, customers, and sales types, including: a tax type maintenance module for assigning a tax type code to each one of a plurality of tax types, including taxable, non-taxable, and tax-exempt types; a tax authority maintenance module for assigning a tax authority code for each one of a plurality of tax authorities; a tax rate maintenance module for assigning a tax rate code for each one of a plurality of tax rate percentages for taxable sales and a zero percentage for non-taxable sales; a customer support file maintenance module for maintaining a customer support file indexed to a customer identification code, including customer identification, a tax type code, a tax authority code, and a tax rate code, for each of the user's customers; and a sales type maintenance module for assigning a sales type code to each one of a plurality of sales types;

(b) a sales entry interface for entering a series of sales orders into the system, wherein each sales order includes a customer identification number, a sales type code, and a sales amount;

(c) a sales recording module for creating a sales record corresponding to each sales order entered, wherein each sales record includes: the sales type as designated by the sales type code; the sales amount; the customer identification, tax type and tax authority as obtained from the customer support file indexed to the customer identification number; and a sales tax amount as computed by application of the tax rate designated by the tax rate code obtained from the customer support file to the sales amount if the tax type is not tax-exempt; and (d) a sales tax reporting module for sorting the sales records by tax authorities, tax types, and sales types, and for creating a sales tax report for each tax authority showing total sales amounts and sales tax amounts for each of the sales types defined for inclusion in the sales tax report if the tax type is taxable, and total sales amount if the tax type is non-taxable or exempt.

In the above-described sales tax tracking and reporting system, definition of the tax type in a support file as exempt allows the system to bypass the computation of a sales tax amount and to report the exempt sales amount.

Other objects, features and advantages of the present invention will be apparent from the following detailed description of the preferred embodiments with reference to the drawings, of which:

DETAILED DESCRIPTION OF PREFERRED EMBODIMENT OF THE INVENTION

In the following description, a preferred system of the invention employs support file indexing for sales tax reporting of intra- and interstate transactions which may include tax exempt sales. However, the general principles described herein are equally applicable to other configurations of sales tax reporting systems, as well as to other types of systems that perform complex rate assessments.

Figure 1:
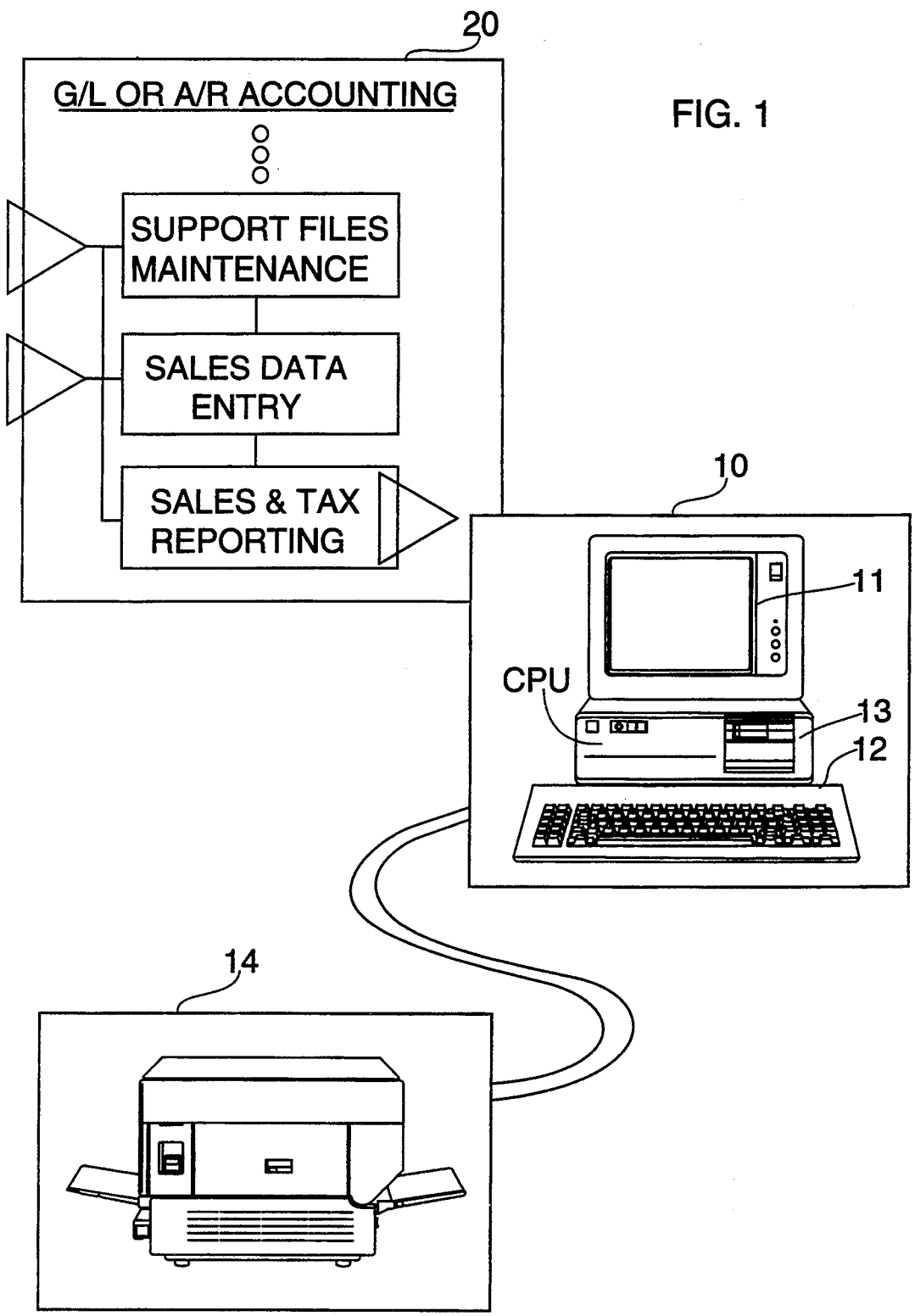
FIG. 1 is a schematic diagram of a preferred embodiment of a computerized system for tracking sales tax assessments on sales transactions.

Referring to FIG. 1, a preferred embodiment of a computerized system for multiple rate assessments on transactions in accordance with the present invention is composed of a computer system 10 including a central processing unit (CPU), display 11, keyboard 12, memory storage 13, and associated printer 14. The computer system is loaded to operate with a general legder (G/L) or accounts receivable program 20. The structure, organization, and features of the G/L or A/R program to perform its accounting functions are well known and need not be described further herein. The components of the generalized G/L or A/R implementing the present invention are a support files maintenance interface 21, sales data entry interface 22, and sales and tax reporting module 23, which will be described in detail further below. The program and particular components are operated by interface with and input from a user of the system, typically, an MIS or accounting employee. An example of a commercial G/L or A/R accounting program which can incorporate these components of the invention is the Accounts Receivable program sold by DSI of Hawaii, Inc., located in Honolulu, Hi.

Figure 2:
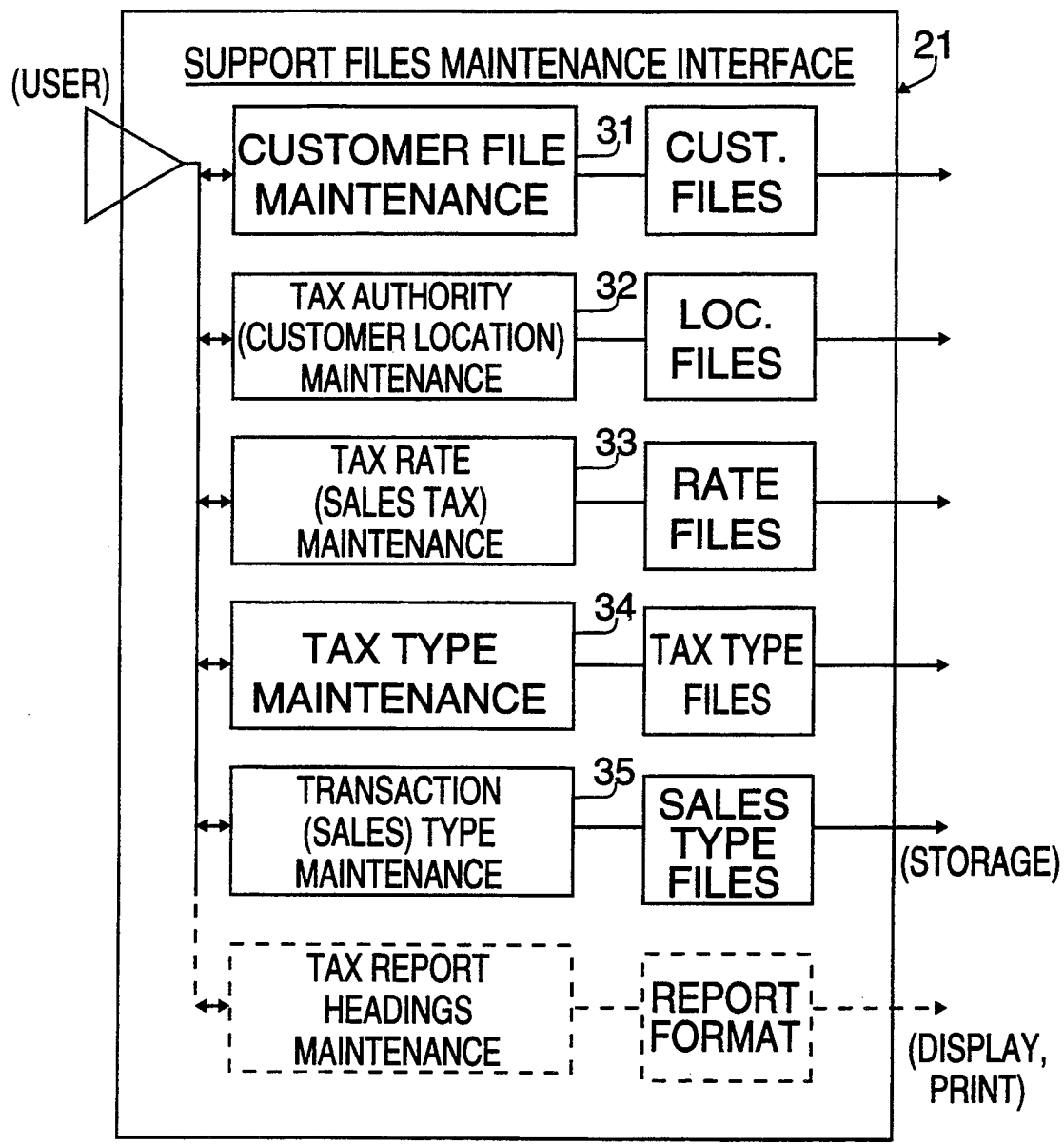
FIG. 2 is schematic diagram of the components of a support files maintenance module.

In FIG. 2, the support files maintenance interface 21 is shown having a customer file maintenance module 31, a taxing authority (customer location) maintenance module 32, a tax rate (sales tax) maintenance module 33, a tax type maintenance module 34, and a transaction (sales) type maintenance module 35. The customer file maintenance module 31 is used to create and maintain customer data in support files for each of the customers of the user of the system. Each customer file is indexed to a customer identification code, and includes identification of the name and address of the customer, a tax type code, a tax authority code, and a tax rate code. The tax authority maintenance module 32 is used to assign a tax authority code for each one of a plurality of tax authorities to be tracked by the system for tax reporting. For the specific application of sales tax reporting, the tax authority applicable to a customer is taken as the customer location, i.e., state and city or county. The tax rate maintenance module 33 is used to assign a tax rate code for each one of a plurality of tax rate percentages for taxable sales and a zero percentage for non-taxable sales. The tax type maintenance module 34 is used to assign a tax type code to each one of a plurality of tax types, for example, taxable, non-taxable, and tax-exempt types. The transaction (sales) type maintenance module 35 is used to assign a sales type code to each one of a plurality of sales types. These maintenance modules generate the support files which are stored and later used for tracking sales transactions entered and for sales tax reporting.

In Appendix A, an example of the screen interface with the user for the customer file maintenance module 31 is shown. This input interface allows the user to add new customer data records, change existing records, or delete inactive records. In particular, the input screen has field (1) for entering a customer identification number, field (2) for the customer name, fields (3–7) for the address, field (16) for the customer location code, field (24) for the tax rate code, and field (25) for the tax type code.

The customer location code indicates the applicable state taxing authority for sales to that customer. The code number is indexed to the corresponding support file generated by the tax authority (customer location) maintenance module 32. For the specific application of sales tax reporting, the primary tax authority for a company in the U.S. is the state and city or county where the company is located.

The tax rate code corresponds to the tax percentage that this customer is normally subject to. The code number is indexed to the corresponding support file generated by the tax rate (sales tax) maintenance module 33 which defines the applicable tax percentage. A tax rate code is assigned to each taxing authority, including for more than one taxing authorities within the same state. If a customer has a legal presence (store or sales locations) in more than one state or in more than one city or county), separate customer files are generated for each state location and/or taxing authority rate code applicable to the customer. Examples of the definition of the tax rate codes are shown in Appendix B. The tax rate definitions may be implemented as a submenu of the sales and tax reporting module 23.

The tax type code indicates the tax type to be reported for sales to that customer for purposes of the sales tax report. The code number is indexed to the corresponding support file generated by the tax type maintenance module 34, which defines the type of tax entity of the customer, such as "Church" "Retail Equipment", "Wholesale", or "Services", a flag whether or not the tax type is exempt, and a tax report code number indicating which grouping the sales of that tax type will be reported under on the sales tax report. As a feature of the invention, the setting of the tax-exempt flag allows the system to override any other support file codes, to bypass any computation of taxes otherwise indicated, and to include the sales transactions under a grouping for tax-exempt sales on the tax report. Examples of the definition of the tax type codes are shown in Appendix C. The tax type definitions may be implemented as a submenu of the sales and tax reporting module 23.

In Appendix D, an example of the screen interface with the user for the transaction (sales) type maintenance module 35 is shown. This input interface allows the user to add new sales type definitions, change existing definitions, or delete inactive definitions. Each sales type corresponds to a type of sales entry which may appear on an invoice or work order, e.g., "Equipment Sale", "Installation Labor", "Materials", "Sales Tax", "Shipping", "Services", etc. The input screen has field (1) for indexing the sales type code, field (2) to identify the sales type entered, field (4) for entering the general ledger account number to which these sales are posted, and field (14) for entering the tax report code number indicating which grouping the sales of that tax type will be reported under on the sales tax report. Examples of the definition of the sales type codes are shown in Appendix E.

Once the background support files have been established, the system is prepared to receive entries of sales transactions, to create a complete sales record based upon information obtained from the customer data, tax authority, tax rate, tax type, and sales type support files stored in memory. In Appendix F, an example of the screen interface with the user for entering sales transactions is shown. This input interface allows the user to add new sales entries, change existing entries, or delete incorrect entries. The input screen has field (1) for entering the customer identification number. The customer support file indexed to that number will be checked and the company name will then be retrieved and displayed on the screen. Field (2) identifies the invoice or order number. Field (3) allows entry of the sales order date. Fields (8,9) allow entry of the tax rate and tax type codes manually. If the user presses the "Enter" key, the system will check the customer support file which is cross-referenced to the tax type and tax rate support files, and will display the tax percentage rate and tax type description as default entries on the screen. Field (10) allows entry of the sales amount and the sales type code. The sales type support file indexed to the code number is checked and the sales type description is then displayed. The sales tax amount is computed and displayed in field (12). The automatic computation of the sales tax amount can be overridden by manual entry.

Figure 3:
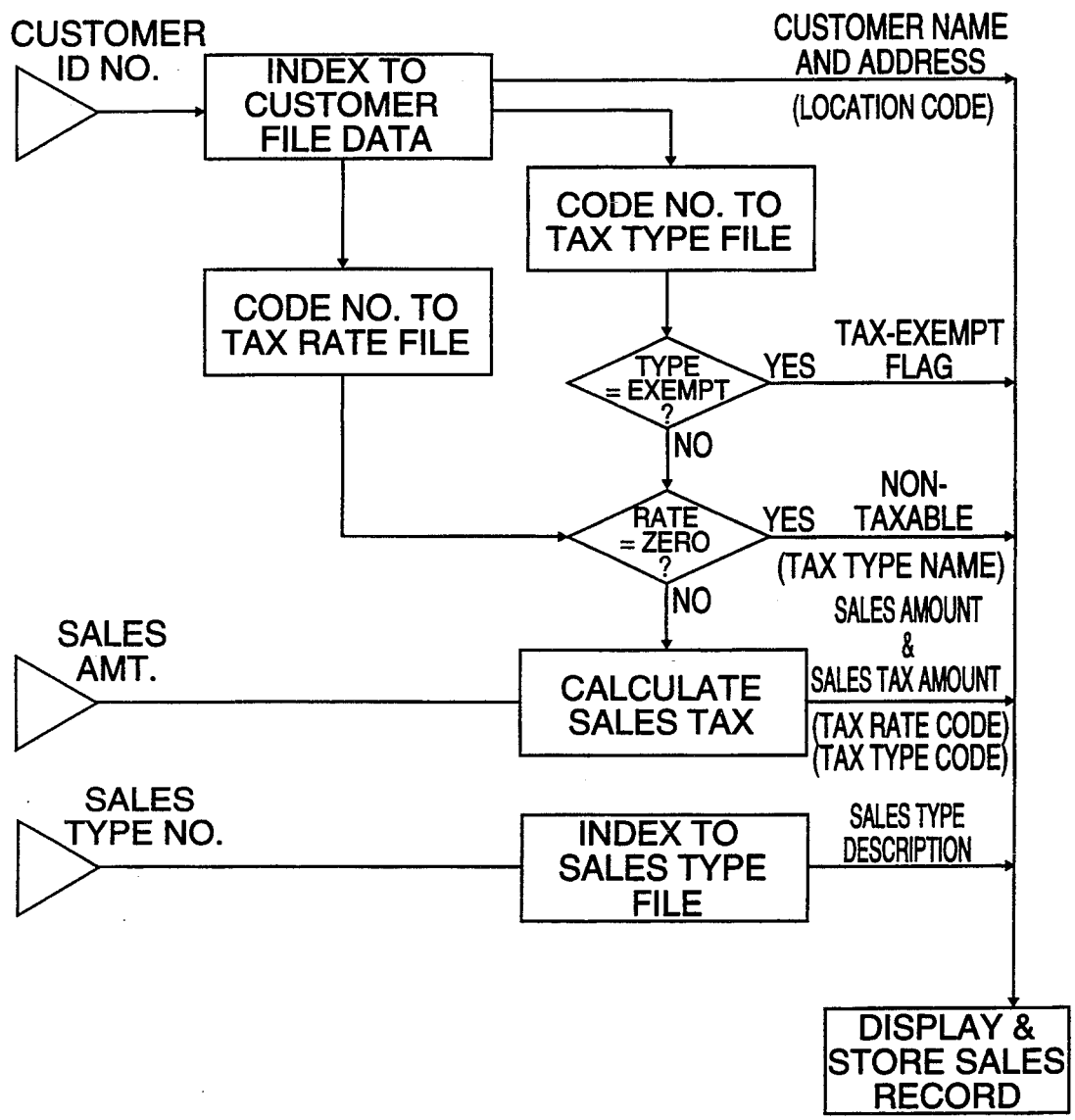
FIG. 3 is logic diagram of the steps for entering a sales transaction entry.

Referring to FIG. 3, a logic diagram of the steps for entering a sales transaction entry is illustrated. The customer identification number entered is used to pull up the corresponding customer file. The customer name and address (location code) is retrieved and added to the sales record. The tax type code is retrieved and used to index to the corresponding tax type file. If the tax type file indicates a tax-exempt type, the tax-exempt flag is noted and given precedence over all subsequent steps, i.e., no sales tax is computed and the sales amount is flagged for reporting in an assigned tax-exempt column. The tax rate code is also retrieved from the customer file and used to index to the corresponding tax rate file. If the tax rate file indicates a non-taxable (zero) rate, the non-taxable status and tax type name are noted and no sales tax is computed. If the tax rate is non-zero, indicating a taxable status, the rate is applied to the input sales amount to compute the sales tax. The sales amount, sales tax amount, tax rate code, and tax type name are noted for the sales record. Entry of the sales type number is used to index to the corresponding sales type file, and the sales type description or name is noted. The sales record is displayed to the user for confirmation and stored in memory. The user continues to enter each sales entry for each invoice or order document until completed, then the next sales invoice or order is processed.

conventionally, a company would spend a great deal of time trying to track sales revenues and tax information for the different sales types that are taxable, non-taxable, or tax-exempt, the sales tax due in each state in which it has a legal presence and is required to collect and report sales taxes, and the breakdown of taxes due to the different taxing authorities within each state. The computerized system of the present invention allows this complex tracking to be accomplished automatically by program operation. A sales tax report can be requested to contain several parts: a detailed breakdown of all revenues and taxes by state and taxing authority; a summary of revenues and taxes organized by state and taxing authority; a total of revenues and taxes for all states; and an optional report of tax-exempt sales.

In Appendix G, an example of the detailed breakdown of all revenues and taxes by state and taxing authority is shown. When this report is requested, the sales entry records are sorted by state. In the example of Appendix G, all revenues generated and sales taxes incurred from customers located in the state of Oregon will be printed on this page. The report is divided into two sections: the top section lists all taxable transactions, and the bottom section lists all non-taxable or tax-exempt transactions. Each detail line represents a revenue or tax item. The items are grouped by taxing authority if more than one taxing authority exists in the state. The report has a number (7) of column headings for different sales types in each of the taxable and non-taxable/tax-exempt sections. The sales amounts for each sales type is listed in the corresponding column. Two columns at the end are used to state all of the revenues and sales taxes (taxable sales only) listed. The sales type names to be printed in each of the columns of the tax report are defined through the tax report heading table which is entered through the support files maintenance interface (as indicated in dashed lines in FIG. 1). An example of column heading names is shown in Appendix H.

Figure 4:
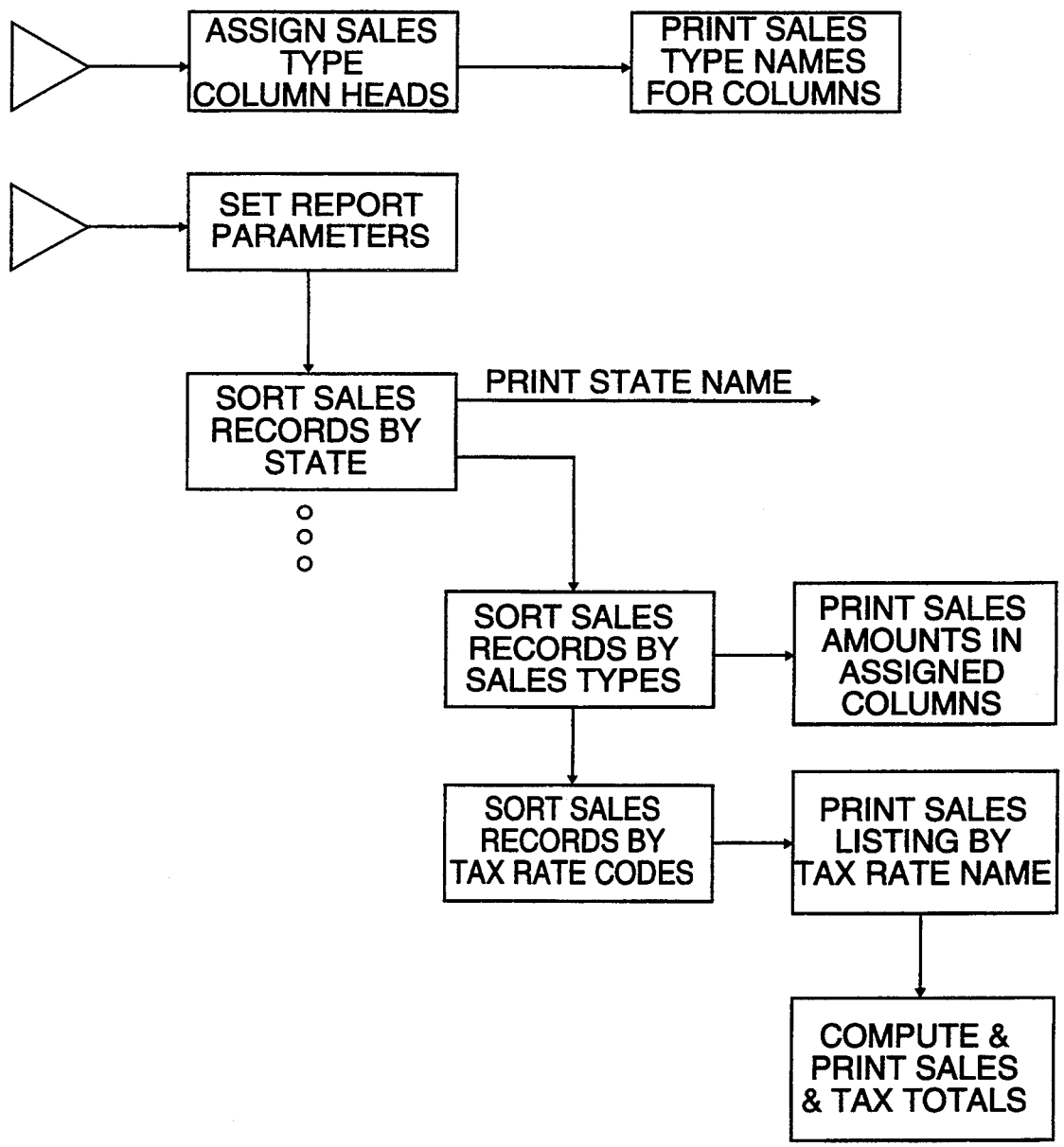
FIG. 4 is a logic diagram of the steps for sorting and generating a sales tax report using the support files and sales data records entered as shown in FIGS. 2 and 3.

FIG. 4 illustrates the logic sequence for sorting and generating a detailed sales tax report using the support files and sales records. The different sales type names, such as "Equipment Sale", "Installation Labor", "Materials", "Shipping", "Services", etc., are designated for the respective column headings through the tax report heading table. A limit of seven taxable column headings and seven non-taxable or tax-exempt headings may be designated. Once the report parameters are set (e.g., date range), the sales records are sorted by location codes for each of the states in which the company is required to report sales tax collections, and the corresponding state name is printed for each state section of the report. The sales records are sorted by sales type codes, and the sales amounts are printed in the respective sales type columns. The sales records are also sorted by tax rate codes, and the tax rate names and types (indicating different taxing authorities) are printed as subheadings along with their respective listings of sales transactions. The totals for sales and tax amounts for each taxing authority are printed in the two end columns of the report.

By the above programmed system of the invention, the tracking and reporting of sales and tax amounts by state, taxing authority, and sales type (general ledger revenue account name) is accomplished automatically by creating support files indexing each customer identification number to customer identification data, state location, tax type, and tax rate, and assigning each sales type code to sales type name and report column. Through this organization, the user of the system need only enter a customer identification number, sales type code, and sales amount to automatically a complete sales record, and to track and report each sales record under the appropriate designations of the sales tax report. This operation of the system greatly simplifies the task of tracking and reporting sales taxes. It can also be adapted in a similar manner to other types of complex rate assessments which require detailed tracking and reporting.

Although the invention has been described with reference to certain preferred embodiments, it will be appreciated that many variations and modifications may be made consistent with the broad principles of the invention. It is intended that the preferred embodiments and all of such variations and modifications be included within the scope and spirit of the invention, as defined in the following claims.

APPENDIX A

CUSTOMER FILE MAINTENANCE - ADD

| | | | | |
|---|---|---|---|---|
| 1. CUSTOMER # | 300000 | | | |
| 2. CUST-NAME | DSI OF HAWAII, INC. | 19. BILL-TO-# | 300000 | |
| 3. ADDRESS-1 | 738 KAHEKA STREET | 20. CUST-STAT | 0 | |
| 4. ADDRESS-2 | SUITE 202 | 21. CONTACT | MALCOLM CHONG | |
| 5. CITY | HONOLULU | 22. SHIP VIA | 1 UPS | |
| 6. STATE | HI | 23. TERMS | 1 NET 30 | |
| 7. ZIP CODE | 96814 | 24. TAX CODE | 40 SALES TAX | |
| 8. PHONE # | (808) 955-6319 | 25. TAX TYPE | 1 RETAIL SAL | |
| 9. SALESMAN # | 10 CARLY BENSON | 26. FIN-CHG ? | Y | |
| 10. CUST-TYPE | 100 OFFICE | 27. ACCT-BAL | | .00 |
| 11. BAL-METHOD | O | 28. SALES MTD | | .00 |
| 12. STATEMENT ? | 1 BY CUSTOMER LOCATION | 29. SALES YTD | | .00 |
| 13. ASCAP-TYPE | 1 REGULAR | 30. COST MTD | | .00 |
| 14. MUSIC-TYPE | | 31. COST YTD | | .00 |
| 15. BMI-TYPE | | 32. L-PUR-DATE | | |
| 16. LOC-CODE | HAWAII | 33. L-PMT-DATE | | |
| 17. NACT DT/TP | 08/15/91 N NEW | 34. LEASE/SOLD | S | |
| 18. CRD-LIMIT | 100,000 | 35. YTD SVC | 1 | |
| 36. CD1: INST. 09/90 1600, AMP, 4 BES, 6 SPKRS, | | | 38. AC-TYP M | |
| 37. CD2: ANT, TUN, ANT LOCATED ON 2ND FLOOR | | | 39. BL-TYP 1 | |
| ANY CHANGE ? . | | | | |

APPENDIX B

Section 5: Sample Tax Codes

Ex. H

| | |
|---|---|
| *1. SALES TAX CODE | 65 |
| 2. DESCRIPTION | 6.5 PERCENT SALES TAX |
| 3. TAX % | 6.500 |
| 4. LIMIT AMT | .00 |
| 5. LIMIT (TAX %) | |

Ex. I

| | |
|---|---|
| *1. SALES TAX CODE | 00 |
| 2. DESCRIPTION | TAX EXEMPT |
| 3. TAX % | 0.000 |
| 4. LIMIT AMT | .00 |
| 5. LIMIT (TAX %) | |

APPENDIX C

Section 3: Sample Tax Type Codes

Ex. A

| | |
|---|---|
| *1. TAX TYPE CDE: | 4 |
| 2. DESCRIPTION: | CHURCH |
| 3. EXEMPT FLAG: | Y |
| 4. I.S.RPT COL#: | 3 |

Ex. B

| | |
|---|---|
| *1. TAX TYPE CDE: | 1 |
| 2. DESCRIPTION: | RETAIL EQUIP |
| 3. EXEMPT FLAG: | N |
| 4. I.S.RPT COL#: | |

Ex. C

| | |
|---|---|
| *1. TAX TYPE CDE: | 2 |
| 2. DESCRIPTION: | MUSIC SERVICES |
| 3. EXEMPT FLAG: | N |
| 4. I.S.RPT COL#: | |

APPENDIX D

SALES CODE FILE MAINT - CHANGE/INQUIRE

| | |
|---|---|
| *1. SALES CODE: | 10 |
| 2. DESCRIPTION: | BACKGROUND |
| 3. WO CAT: | O |
| 4. GL ACCT #: | 0000 |

APPENDIX D-continued

SALES CODE FILE MAINT - CHANGE/INQUIRE

| | |
|---|---|
| 5. REC/MAINT: | R |
| 6. MUZAK (Y/N): | Y ROYALTY SUMMARY CODE: E ENVIRON |
| 7. ASCAP (Y/N): | Y DED FROM MUZAK ROYAL: Y |
| 8. BMI (Y/N): | Y DED FROM MUZAK ROYAL: Y |
| | BMI TYPE (1,2,3): 2 OFF PREMISE |
| 9. APPEAR ON COM RPT (Y/N): | N |
| 10. COMMISSION %: | .000% |
| 11. LEASE / SOLD (L/S): | S |
| 12. 12MO SLS HIST LINE NBR: | 10 |
| 13. MGMT ANALYSIS FLG: | 1 RECURRING |
| 14. I.S.TAX RPT HDG/COL.: | |
| ANY CHANGE ? . | |

APPENDIX E

Section 4: Sample Sales Codes

Ex. D

| | |
|---|---|
| *1. SALES CODE: | 10 |
| 2. DESCRIPTION: | EQUIPMENT SALE/INSTALL |
| 3. WO CAT: | P |
| * | |
| * | |
| 14. I.S.TAX RPT HDG/COL.: | T1 |

Ex. E

| | |
|---|---|
| *1. SALES CODE: | 20 |
| 2. DESCRIPTION: | INSTALLATION LABOR |
| 3. WO CAT: | O |
| * | |
| * | |
| 14. I.S.TAX RPT HDG/COL.: | N5 |

APPENDIX E-continued

Section 4: Sample Sales Codes

Ex. F

| | |
|---|---|
| *1. SALES CODE: | 30 |
| 2. DESCRIPTION: | SALES TAX |
| 3. WO CAT: | T |
| * | |
| * | |
| 14. I.S.TAX RPT HDG/COL.: | S1 |

Ex. G

| | |
|---|---|
| *1. SALES CODE: | 40 |
| 2. DESCRIPTION: | MUSIC SERVICES |
| 3. WO CAT: | O |
| * | |
| * | |
| 14. I.S.TAX RPT HDG/COL.: | N6 |

APPENDIX F

SALES ENTRY - ADD

| | | | |
|---|---|---|---|
| 1. CUSTOMER # 300000 DSI OF HAWAII, INC. | | 10. SALE AMT BAD DEBT WRITE OFF | 20.00 CD 60 |
| | | * # LOC-PER | 12 |
| 2. DOCUMENT # 641 | | 11. MISC AMT | .00 |
| 3. DOC-DATE 11/19/90 | | | |
| 4. DOC-TYPE C | | 12. TAX AMT | .00 |
| 5. APPLY-TO # 3421 | | | |
| | | 13. FREIGHT | .00 |
| 6. REFERENCE BAD DEBT | | | |
| | | TOTAL | 20.00 |
| 7. SALESMAN 20 SALESMAN 20 | | 14. COST AMT | .00 |
| 8. TAX CODE 40 7.600% | | | |
| 9. TAX TYPE 1 RETAIL | | 15. COMM-AMT | .00 |
| ANY CHANGE ? . | | | |

APPENDIX G

Section 1: Sample I.S. Detail Report
MUSICAL MAKERS, INC.
MONTHLY I.S. TAX DETAIL REPORT
STATE: OR

TAXABLE REVENUE:

| COUNTY/CITY CUST-# | DOC-# | DOC-DATE | SC | SEQ# | EQUIP | EQUIP MAINT | TAXABLE REVENUE | SALES TAX |
|---|---|---|---|---|---|---|---|---|
| 65 6.5 PERCENT SALES TAX | | | | | | | | |
| 100001 | 5284 | 02/11/91 | 10 | 0000 | 20.00 | | 20.00 | |
| 100001 | 5284 | 02/11/91 | 30 | 0000 | | | | 1.30 |
| | | | | | 20.00 | | 20.00 | 1.30 |

NON-TAXABLE REVENUE:

| COUNTY/CITY CUST-# | DOC-# | DOC-DATE | SC | SEQ# | FED GOVT | IN STATE | CHURCH | OUT OF STATE | LABOR | MUSIC SVC | NON-TXBL REVENUE |
|---|---|---|---|---|---|---|---|---|---|---|---|
| 00 TAX EXEMPT | | | | | | | | | | | |
| 100002 | 00004 | 02/12/91 | 10 | 0000 | | | 12.50 | | | | 12.50 |
| 65 6.5 PERCENT SALES TAX | | | | | | | | | | | |
| 100001 | 409102 | 02/28/91 | 40 | 0000 | | | | | | 70.00 | 70.00 |

APPENDIX G-continued

Section 1: Sample I.S. Detail Report
MUSICAL MAKERS, INC.
MONTHLY I.S. TAX DETAIL REPORT
STATE: OR

| | | | | 12.50 | | 70.00 | 82.50 |
|---|---|---|---|---|---|---|---|

APPENDIX H

I.S. TAX RPT HEADING TABLE - ADD

| *1. COMPANY NO. 400 | | | | | | |
|---|---|---|---|---|---|---|
| *** TAXABLE REVENUE *** | | | | *** NON-TAXABLE REVENUE *** | | |
| 2. COL #1 | TOP | | 16. COL #1 | TOP | | FED |
| 3. | BOTTOM | EQUIP | 17. | BOTTOM | | GOVT |
| 4. COL #2 | TOP | | 18. COL #2 | TOP | | IN |
| 5. | BOTTOM | | 19. | BOTTOM | | STATE |
| 6. COL #3 | TOP | | 20. COL #3 | TOP | | |
| 7. | BOTTOM | | 21. | BOTTOM | | CHURCH |
| 8. COL #4 | TOP | EQUIP | 22. COL #4 | TOP | | OUT OF |
| 9. | BOTTOM | MAINT | 23. | BOTTOM | | STATE |
| 10. COL #5 | TOP | | 24. COL #5 | TOP | | |
| 11. | BOTTOM | | 25. | BOTTOM | | LABOR |
| 12. COL #6 | TOP | | 26. COL #6 | TOP | | MUSIC |
| 13. | BOTTOM | | 27. | BOTTOM | | SVC |
| 14. COL #7 | TOP | | 28. COL #7 | TOP | | |
| 15. | BOTTOM | | 29. | BOTTOM | | |
| ANY CHANGE ? . | | | | | | |

I claim:

1. A computerized system for entering transactions with customers which are of different types and have different types and rates of rate assessments for different rate assessment authorities assessed on the value of the transactions, and for thereafter automatically generating a report of rate assessments on the entered transactions applicable to any specified rate assessment authority, comprising:

(a) a computer having a processor which is programmed for tracking different types and rates of rate assessments for different rate authorities and which is operatively coupled to a display screen, memory storage, input means, and output means;

(b) said memory storage storing a plurality of data files including:
(1) a customer identification support file;
(2) an assessment rate support file;
(3) an assessment type support file;
(4) a transaction type support file; and
(5) a transaction data file;

(c) said processor being programmed for providing a support file maintenance interface to the user through display on said display screen, inputting data by said input means, and storing data in the respective support files in said memory storage, said support file interface including:

(1) first maintenance means for assigning, for each customer entry maintained in said customer identification support file, a customer identification (ID) code, a customer location code, and an assessment rate code and type code corresponding to an applicable rate assessment authority for rate assessments on transactions for the assigned customer location code;

(2) second maintenance means for assigning, for each assessment rate entry maintained in said assessment rate support file, a rate percentage amount corresponding to the respective assessment rate code;

(3) third maintenance means for assigning, for each assessment type entry maintained in said assessment type support file, a rate assessment type description corresponding to the respective assessment type code; and (4) fourth maintenance means for assigning, for each transaction type entry maintained in said transaction type support file, a transaction type description corresponding to the respective transaction type code;

(d) said processor being further programmed for providing a transaction data interface to the user through display on said screen display, inputting data by said input means, and storing data in the transaction data file in said memory storage, said transaction data interface including:

(1) transaction data entry means for entering a customer ID code, transaction type code, and transaction value amount for each transaction being entered;

(2) assessment retrieving means for automatically retrieving and displaying the assessment rate code, percentage amount, assessment type code, and type description applicable to the respective transaction being entered through said transaction data interface, based upon the customer ID code for the transaction being linked to the corresponding customer entry maintained in said customer identification support file, and the assessment rate code and assessment type code maintained in the latter support file being linked to the corresponding assessment percentage amount and type description maintained respectively in said assessment rate support file and in said assessment type support file;

(3) assessment calculating means for automatically calculating the rate assessment applicable to the respective transaction based upon the assessment percentage amount retrieved by said assessment retrieving means and the transaction value amount; and (4) transaction description retrieving means for retrieving and displaying the transaction description applicable to the respective transaction based upon the transaction type code for the transaction being linked to the corresponding transaction type entry maintained in said transaction type support file;

(e) said processor being further programmed for automatically generating a rate assessment report of rate assessments on entered transactions applicable to any specified rate assessment authority for display on said display screen and outputting data by said output means, based upon sorting the transaction entries stored in said transaction data file by customer location code, rate assessment type code, and transaction type code.

2. A computerized system in accordance with claim 1, wherein the rate assessments are sales tax assessments for different taxing authorities on different types of sales transactions, and the transaction types include transactions that are subject to sales tax assessment, subject to no sales assessment, and exempt from sales tax assessment.

3. A system in accordance with claim 2, wherein each customer identification of the customer support file includes an identification of tax reporting location, and the sales tax reporting module includes programmed means for sorting the sales records by tax reporting location.

4. A system in accordance with claim 2, wherein the sales tax reporting module includes programmed means for listing the amounts of the sales transactions in designated columns corresponding to sales types.

5. A system in accordance with claim 2, wherein the sales tax reporting module includes programmed means for listing the sales transactions by separate tax authorities.

6. A system in accordance with claim 2, wherein the sales recording module includes programmed means for setting a tax-exempt flag if the tax type is tax-exempt.

7. A system in accordance with claim 2, wherein a tax rate code is established for each separate taxing authority, and the tax rate code is used for referencing the respective taxing authority in the tax report.

* * * * *